United States Patent [19]

Burkey et al.

[11] 4,105,717

[45] Aug. 8, 1978

[54] NAILABLE VINYL CHLORIDE-BASED INJECTION-MOLDING COMPOUND

[75] Inventors: David J. Burkey, Millersville; Clifford M. Rosenau, Willow Street, both of Pa.

[73] Assignee: Armstrong Cork Company, Lancaster, Pa.

[21] Appl. No.: 687,494

[22] Filed: May 18, 1976

[51] Int. Cl.[2] .................... C08L 9/06; C08L 23/04; C08L 47/00
[52] U.S. Cl. .................................. 260/889; 260/890; 260/892; 260/899
[58] Field of Search ........................ 260/889, 890

[56] References Cited

U.S. PATENT DOCUMENTS

| | | | |
|---|---|---|---|
| 2,924,545 | 2/1960 | Daly | 260/891 |
| 3,398,114 | 8/1968 | Pollock | 260/45.75 |
| 3,644,589 | 2/1972 | Moore et al. | 260/890 |

*Primary Examiner*—J. Ziegler
*Attorney, Agent, or Firm*—Sughrue, Rothwell, Mion, Zinn and Macpeak

[57] ABSTRACT

Polyvinyl chloride injection-molding compounds resistant to splitting when nailed during assembly operations comprising a polyvinyl chloride-based resin, from 15 to 25 parts per 100 of the base resin of chlorinated polyethylene, from 20 to 80 parts per 100 of styrene-acrylonitrile copolymer and from 5 to 15 parts per 100 of a styrene-butadiene random or block copolymer rubber.

16 Claims, No Drawings

NAILABLE VINYL CHLORIDE-BASED INJECTION-MOLDING COMPOUND

BACKGROUND OF THE INVENTION

It has been known in the art to utilize polyvinyl chloride injection-molding compounds in compositions for the production of a wide variety of materials including furniture components. Experience with such PVC injection-molding compositions, however, has shown that they are subject to splitting or cracking when nailed during assembly operations. Where efforts are made to modify PVC formulations to improve nailability of the injection-molded products, however, this has heretofore frequently resulted in a sacrifice of other important properties, especially processability of the PVC in injection-molding equipment.

SUMMARY OF THE INVENTION

The invention relates to improved PVC injection-molding compounds having superior split and crack resistance. The compositions also have favorable viscosity and resistance to shear burning during injection. The compositions comprise polyvinyl chloride-based resin mixed or compounded with the following components on a parts per 100 parts of resin basis: from about 15 to 25 parts of chlorinated polyethylene, from about 20 to about 80 parts of styrene-acrylonitrile copolymer and from about 5 to 15 parts of a styrene-butadiene random or blockcopolymer. The resulting products offer the further advantage of being highly flame retardant (UL 94 Test — V = O).

DETAILED DESCRIPTION OF THE INVENTION

The base polymer is polyvinyl chloride. While a PVC homopolymer may be employed it has been found that superior results are obtained using a vinyl chloride-propylene copolymer. Copolymers containing about 7-10% propylene are preferred. These resins do not "unzipper" or degrade as readily as the pure PVC and also are less viscous when melted. PVC homopolymers which may be used in the invention include materials commercially available, such as Firestone's FPC 965 (S.V. −0.194), and Borden's VC 95 (S.V. −0.186).

The chlorinated polyethylene component is preferably one having from about 24 to 48% chlorine substitution and 36% chlorine substitution has been found to be optimum. Suitable materials are commercially available, such as DOW CPE 3614.

The styrene-acrylonitrile copolymers suitable for use in the compositions of the invention are predominantly styrene with typical copolymers containing, e.g., about 70% and preferably about 80% styrene. Suitable materials are commercially available such as Union Carbide RMDA 4420 and DOW TYRIL 860.

The styrene-butadiene copolymer component is a thermoplastic elastomer. Shell's block copolymer SBR's have been found among commercially available materials to be most useful in the composition of the invention. In particular, Shell's KRATON #3204 has been found to be satisfactory. Suitable random styrene-butadiene copolymers are commercially available as Goodyear's PLIOFLEX 1502, Goodrich's AMERIPOL 1502 and Polysar Ltd's CRYLENE 1502.

In general, the compositions are prepared as follows:

1. Heat the PVC copolymer resin and chlorinated polyethylene to about 180° F., in a Henschel-type high intensity mixer.
2. Add stabilizer (usually an organotin mercaptide, e.g., M & T's Thermolite-31) and heat to 200° F.
3. Add process aids and lubricants (e.g., Acryloid K-120N and Hoescht Wax OP) and heat to 220° F.
4. Cool to about 120° F.
5. Add pigment, SBR (e.g., Kraton 3204), and SAN (e.g., RMDA-4420) and mix until blended (1-2 minutes at low speed).
6. Dump.

The purpose of this procedure is threefold: (1) Concentrate the stabilizer in components that need it (PVC and CPE), (2) melt and disperse the wax, and (3) cool sufficiently before dumping to prevent caking.

Successful blending may also be accomplished by adding everything but the liquid stabilizer to a low intensity ribbon blender, blending until well mixed, adding the liquid stabilizer and again blending until well mixed. The blend is then fed to some type of pelletizer (extruder/chopper, Farrel mixer/hammer mill, Ko-Kneader/mill/dicer, etc.) for consolidation.

Any injection-molding equipment with adequate L/D ratio screws is expected to be able to take the dry-blended mix from either the Henschel mixer or ribbon blender directly, thus eliminating the fusing-/pelletizing operations. Therefore, it is apparently not critical how the material is mixed, so long as a thoroughly blended mix is obtained.

The compositions of the invention are preferably used in reciprocating-screw injection molders or other equipment with similar or lower shear and residence time characteristics. It is not expected that the material would function particularly well in ram-type injection molding machines.

The material should not be run arbitrarily in extrusion equipment without due consideration to shear rates, flow patterns in the gates, sprues and runners and mold design. Care must be exercised when running the material in any injection-molding system to avoid catastrophic depolymerization of the PVC and CPE materials. The composition of the invention, however, is much easier to run in any given equipment than are conventional PVC injection-molding compounds. The properties of the molded compound should not be particularly sensitive to the molding technique, so long as polymer degradation has been avoided and good, fundamental, injection-molding practice has been followed.

Typical run conditions for making typical products, e.g., an armoire door and an imitation "carved" drawer front are as follows:

|  | Armoire Door | Drawer Front |
|---|---|---|
| Barrel temps. feed end | 325° F. | 310° F. |
| middle | 370° F. | 335° F. |
| front | 390° F. | 370° F. |
| nozzle | 335° F. | 350° F. |
| Injection time | 14 sec. | 7.5 sec. |
| Screw run time | 19 sec. | 9.5 sec. |
| Cooling time (mold at 70° F.) | 51 sec. | 25 sec. |
| Overall cycle time | 90 sec. | 47 sec. |
| Part weight | 3.4 lb. | 1.4 lb. |

Prior art PVC molded parts produced in the same fashion were subject to cracking and splitting when nailed on a wire-fed automatic nailer. The compositions of the present invention, however, when subjected to the same nailing assembly operation were significantly less susceptible to cracking and splitting.

The invention will be better understood in connection with the following specific example:

EXAMPLE 1

Compositions in accordance with the invention were blended and injection-molded in a screw injection molder in accordance with standard practice. The products were also subjected to tests for flame retardancy, nail withdrawal (a measure of the holding power of the resin when nailed), and nailability and other physical properties were also measured. The formulations and the properties of the resulting injection molded products are set forth below.

| Formulations | Composition A (Parts by Weight) | Composition B (Parts by Weight) |
|---|---|---|
| Vinyl chloride polymer (Vinyl chloride-propylene copolymer) | 100 (Airco 420) | 100 (Airco 405) |
| Chlorinated Polyethylene (CPE 36-14) | 20 | 20 |
| Thermal Stabilizer (T-31, M+T Chem) | 5 | 5 |
| Processing Aids | | |
| a) Acrylic (Acryloid K-120 Rohm & Haas) | 2 | 2 |
| b) Wax (OP American Hoechst) | 2 | 2 |
| Styrene-Acrylonitrile Copolymer (RMDA-4420) | 25 | 50 |
| Styrene-butadiene Copolymer (KRATON 3204) | 10 | 10 |
| Sb$_2$O$_3$ | — | .5 |
| Fire Retardant (FIREBRAKE ZB) | — | 1.0 |
| Pigment - TiO$_2$ (pigment grade) | 0.66 | 0.76 |

| Properties of Products | Composition A (Parts by Weight) | Composition B (Parts by Weight) |
|---|---|---|
| Melt Index (Cond - F - 190° C at 432.5 psi (g/min) | 31.6 | 13.1 |
| Charpy Impact ⅛" | 4.1 | 8.6 |
| HDT (264 psi; ⅛") | (Not measured) | 141 |
| (264 psi; ¼") | 142 | 147 |
| SAG (24 hr. - 160° F)(in) | 1.21 | 0.19 |
| UL-94 (Flame Retardancy) | V - O | V - O |
| Nail Withdrawal | 88 lb. | (Not Measured) |
| Nailability | Good | Good |

While the invention has been described with respect to certain illustrative examples, it will be understood that such examples should not be considered as limiting the scope of the invention which should be construed in the light of the following claims.

What is claimed is:

1. A polyvinyl chloride composition comprising
   (a) as the major component a vinyl chloride polymer component selected from the group consisting of a copolymer comprising vinyl chloride as a predominant comonomer and a minor amount of propylene as a comonomer, and vinyl chloride homopolymer,
   (b) as a minor component, chlorinated polyethylene,
   (c) as a minor component a predominantly styrene copolymer of styrene and acrylonitrile, and
   (d) as a minor component a styrene-butadiene copolymer thermoplastic elastomer,
   said composition being characterized by resistance to splitting as the result of being nailed when such compositions are formed into molded articles by injection-molding processes.

2. The composition of claim 1 wherein on the basis of parts by weight said components are present in the following amounts:

| Component | Parts |
|---|---|
| Vinyl chloride polymer | 100 |
| Chlorinated polyethylene | 15 - 25 |
| Styrene-acrylonitrile copolymer | 20 - 80 |
| Styrene-butadiene copolymer | 5 - 15 |

3. The composition of claim 2 wherein said vinyl chloride polymer component is a vinyl chloride-propylene copolymer comprising from about 7–10% propylene.

4. The composition of claim 2 wherein said chlorinated polyethylene is substituted to the extent of from 24 to 48% of chlorine.

5. The composition of claim 2 wherein said styrene-acrylonitrile copolymer comprises about 70% styrene.

6. The composition of claim 2 wherein said vinyl chloride polymer component is a vinyl chloride-propylene copolymer comprising from about 7–10% propylene, said chlorinated polyethylene is substituted to the extent of from 24 to 48% of chlorine, and said styrene-acrylonitrile copolymer comprises about 80% styrene.

7. The composition of claim 2 further comprising a flame retardant agent.

8. The composition of claim 3 further comprising a flame retardant agent.

9. The composition of claim 4 further comprising a flame retardant agent.

10. The composition of claim 5 further comprising a flame retardant agent.

11. The composition of claim 5 further comprising a flame retardant agent.

12. The composition of claim 1 wherein said vinyl chloride polymer component is a vinyl chloride-propylene copolymer comprising from about 7–10% propylene.

13. The composition of claim 1 wherein said chlorinated polyethylene is substituted to the extent of from 24 to 48% of chlorine.

14. The composition of claim 1 wherein said styrene-acrylonitrile copolymer comprises about 70% styrene.

15. The composition of claim 1 wherein said vinyl chloride polymer component is a vinyl chloride-propylene copolymer comprising from about 7–10% propylene, said chlorinated polyethylene is substituted to the extent of from 24 to 48% of chlorine, and said styrene-acrylonitrile copolymer comprises about 70% styrene.

16. The composition of claim 1 further comprising a flame retardant agent.

* * * * *

UNITED STATES PATENT OFFICE
CERTIFICATE OF CORRECTION

PATENT NO. : 4,105,717
DATED : August 8, 1978
INVENTOR(S) : David J. Burkey et al It is certified that error appears in the above-identified patent and that said Letters Patent are hereby corrected as shown below:

Claim 11, line 1 - delete "claim 5" and insert therefor --claim 6--

Signed and Sealed this

Thirteenth Day of March 1979

[SEAL]

Attest:

RUTH C. MASON
Attesting Officer

DONALD W. BANNER
Commissioner of Patents and Trademarks